United States Patent [19]

Reunamäki et al.

[11] Patent Number: 4,891,056
[45] Date of Patent: Jan. 2, 1990

[54] ADJUSTING DEVICE FOR THE BLAST PRESSURE IN THE COOLING NOZZLES OF A GLASS TEMPERING APPARATUS

[75] Inventors: Pauli T. Reunamäki; Erkki P. J. Yli-Vakkuri, both of Tampere, Finland

[73] Assignee: Tamglass Oy, Tampere, Finland

[21] Appl. No.: 165,175

[22] Filed: Mar. 7, 1988

[30] Foreign Application Priority Data

Mar. 16, 1987 [FI] Finland ................................. 871132

[51] Int. Cl.4 ............................................. C03B 27/04
[52] U.S. Cl. ........................................ 65/348; 65/351
[58] Field of Search ......................... 65/114, 348, 351; 137/556, 569, 597; 98/38.5, 38.6, 38.9

[56] References Cited

U.S. PATENT DOCUMENTS

| | | | |
|---|---|---|---|
| 4,076,511 | 2/1978 | Fulton et al. | 65/114 |
| 4,361,432 | 11/1982 | McMaster et al. | 65/351 |
| 4,508,783 | 4/1985 | Aubry et al. | 65/351 |
| 4,525,193 | 6/1985 | McMaster et al. | 65/114 |

FOREIGN PATENT DOCUMENTS 1550081  8/1979  United Kingdom .

*Primary Examiner*—Joye L. Woodard
*Attorney, Agent, or Firm*—Burns, Doane, Swecker & Mathis

[57] ABSTRACT

The invention relates to an adjusting device for the blast pressure in cooling nozzles of a glass tempering apparatus, said device comprising at least two blowers each with its own vane adjuster, blast ducts between the blowers and an air-distribution chamber, and a bypass duct linking the blast ducts. Between blast duct and air-distribution chamber downstream of by-pass duct there is fitted a throttle valve, which is in a throttle position when one blower is running with its vane adjuster partly or completely open. Thus, merely by adjusting said vane adjusters it is possible to cover a pressure range of 5-7000 Pa which is sufficient for glass thicknesses of 4-19 mm.

12 Claims, 2 Drawing Sheets

ADJUSTING DEVICE FOR THE BLAST PRESSURE IN THE COOLING NOZZLES OF A GLASS TEMPERING APPARATUS

BACKGROUND AND SUMMARY OF THE PRESENT INVENTION

The present invention relates to an adjusting device for the blast pressure in the cooling nozzles of a glass tempering apparatus, said device comprising at least two blowers, each with its own vane adjuster, blow ducts between the blowers and an air distribution chamber, and a by-pass duct linking said blow ducts.

With this type of prior known adjusting device, the vane adjustment may cover a pressure range that is sufficient for glass thicknesses of 4-12 mm. The attached FIG. 4 illustrates the relationship between glass thickness and required pressure in a semi-logarithmic scale. The high pressure readings required for 4 mm thick glasses are achieved when both blowers are running and the required adjustment is effected by setting the vane angle of vane adjusters. The blast pressure required for glass thicknesses of 5-12 mm is accomplished by keeping one of the blowers stopped with its vane adjuster shut off and by regulating the vane adjuster of a rotating blower. The adjustment ratio of a vane adjuster is in the order of 1:100. Even when shut off, said vane adjuster does not completely close the flow channel (=blower intake port), but said 1/100 of the pressure remains acting on the nozzles. As a result of this and the adjustment ratio of a vane adjuster, this prior known system cannot reach sufficiently low pressures to make it possible to anneal or temper also glasses having a thickness of 15 mm and 19 mm by using the same pressure regulation system. As seen from the curve of FIG. 4, the pressure range required by these glass thicknesses cannot be reached either, even if the vane adjuster of a stopped blower were opened all the way while keeping the vane adjuster of a rotating blower shut off. It is prior known to provide the above type of apparatus with a separate propeller fan whose pressure range is suitable for tempering glass sheets having a thickness of 10-19 mm. This incurs extra equipment costs and operation is more complicated since different cases require the use of different blower systems. Neither is it possible to effect continuous control of blast pressure over the maximum output of a propeller fan. This would be necessary, however, if e.g. a 10 mm glass were to be cooled at a constant cooling rate.

It is also prior known to employ an inverter or direct-current operation for controlling the pressure over an entire desired pressure range but such arrangements are highly expensive and sophisticated and thus also given to malfunctions.

An object of the invention is to further develop this prior know pressure adjusting device so that, by means of a mere vane adjustment, it is possible to cover a pressure range (typically 7000-5 Pa) that is sufficient for tempering glasses having a thickness of 4-19 mm.

This object is achieved by means of an adjusting device of the invention on the basis of the characterizing features set forth in the annexed claims.

BRIEF DESCRIPTION OF THE DRAWING FIGURES

One embodiment of the invention will now be described in more detail with reference made to the accompanying drawings, in which FIG. 1 shows a blast assembly, associated with a glass tempering apparatus and provided with a blast pressure adjusting device of the invention.

DETAILED DESCRIPTION OF THE PREFERRED EMBODIMENTS

Figure 1:
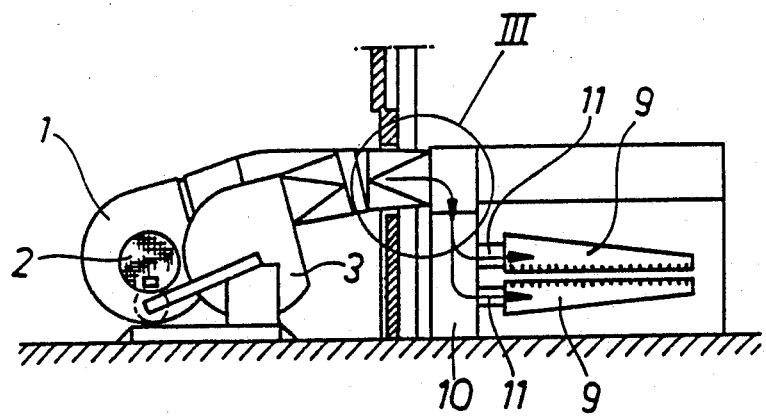
Figure 2:
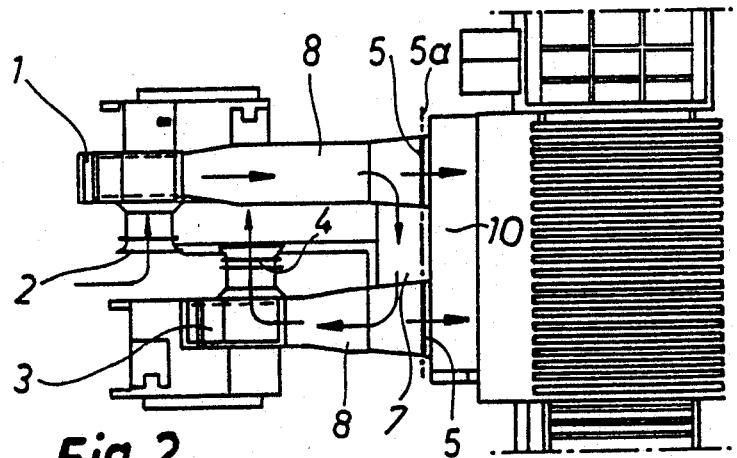
FIG. 2 shows the same as FIG. 1 in plan view.

The blast assembly comprises two blowers 1 and 3 connected by way of blast ducts 8 to an air-distribution chamber 10, which is linked by way of distributing ducts 11 to nozzle blocks 9 with the glass sheets being tempered advancing therebetween.

Figure 3:
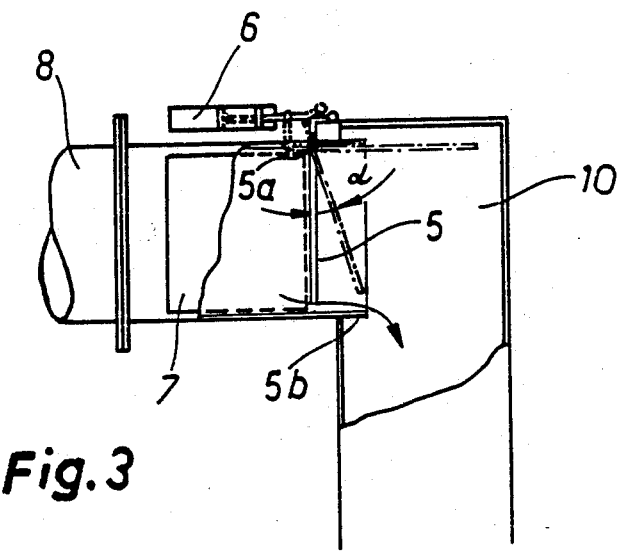
FIG. 3 shows an enlarged detail III of FIG. 1.

The adjustment of blast pressure for nozzles 9 is effected by means of vane adjusters 2 and 4 and also by means of throttles 5 of the invention, mounted on a common axis 5a and positioned between blast ducts 8 and air-distribution chamber 10 downstream of by-pass duct 7. Said ducts 8 can also have one common inlet from by-pass duct 7 into chamber 10 in which case just one throttle 5 is required. A cylinder 6 (FIG. 3) provides an air spring for holding throttles 5 in a throttling position with a certain force. In the present case, the maximum throttling effect is achieved with throttles 5 pointing downwards, a certain amount of air being able to pass through between the bottom edge of throttles 5 and a wall 5b. The pressure prevailing in ducts 7, 8 seeks to turn throttles 5 and thus the pressure in chamber 10 increases.

Since both throttles 5 operate together and are mounted on a common axis and thus make up a two-piece throttle valve, hereinafter a singular form is used for valve 5.

The force of cylinder 5, which counteracts the turning of valve 5, is chosen so that valve 5 remains in its maximum throttle position when the pressure in chamber 10 (or generally between blast nozzles 9 and throttle valve 5) is at a desired minimum reading, e.g. 5 Pa within the adjustable pressure range.

Instead of air spring 6, the constant force counteracting the turning of valve 5 can also be on the own weight of throttle valve 5. This requires the proper selection of a point of suspension. The use of air spring 6 offers the advantage that cylinder 6 can be used for turning said throttle valve 5 to an open position automatically after valve 5 has turned more than a certain angle $\alpha$, i.e. beyond the adjustment range of throttle valve 5, in other words the position of throttle valve 5 no longer has any effect on pressure. The cylinder space of cylinder 6 serving as an air spring is dimensioned sufficiently large, so that valve 5 is able to open as a result of a sudden pressure shock in ducts 8, 7.

Figure 4:
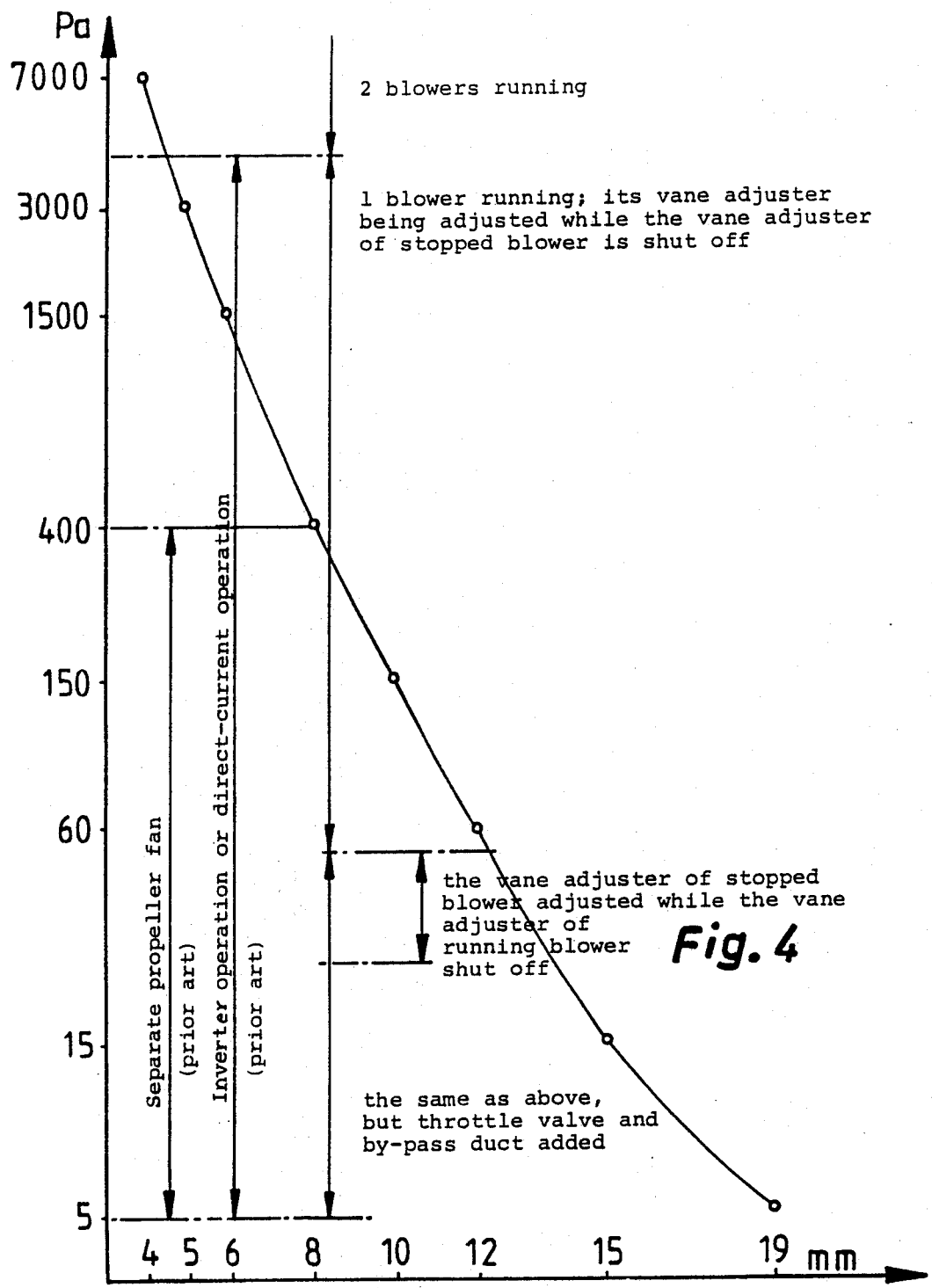
FIG. 4 illustrates the relationship between the thickness of a glass to be temperared and the blast pressure in a semi-logarithmic scale.

The adjustment of blast pressure is effected as follows. When tempering glasses having a thickness of 5-19 mm, one blower 1 is running with vane adjuster 2 shut off and the other blower 3 is stopped with its vane adjuster partly or completely open. With vane adjuster 2 shut off, air is flowing into blower 1 since the vane adjuster is not completely tight. Air is directed by way of by-pass duct 7 into duct 8 of blower 3 from which the air discharges through the open vane adjuster 4. When throttle valve 5 is in its maximum throttle position, said nozzles 9 will acquire a desired minimum pressure 5 Pa for thick 19 mm glasses (see FIG. 4).

By gradually closing vane adjuster 4, said throttle valve 5 opens automatically little by little as the pressure in by-pass duct 7 increases, the pressure also increasing on nozzles 9. When vane adjuster 4 is completely closed, said throttle valve 5 has opened through angle $\alpha$ and no longer has any practical effect on the level of pressure for nozzles 9. Thus, throttle valve 5 can be opened completely by means of cylinder 6. If pressure should be increased further from the reading obtained with vane adjuster 4 of blower 3 shut off, the vane adjuster 2 of blower 1 is turned towards an open position and the increase of pressure is now effected by opening said vane adjuster 2.

When pressure is further increased for glass thickness 4 mm, both blowers 1 and 3 are actuated and the adjustment is effected by setting both vane adjusters 2 and 4 while throttle valve 5 is open.

We claim:

1. A device for adjusting the blast pressure of a glass tempering apparatus, said device comprising an air-distribution chamber for supplying blast air to nozzle blocks of a glass tempering apparatus, at least two blowers, each of said blowers having a corresponding vane adjuster, blast ducts interconnecting each of the blowers with the air-distribution chamber, a by-pass duct interconnecting said blast ducts, throttle valve means pivotably mounted in said blast ducts at the interconnection with said air-distribution chamber and downstream of said by-pass duct for throttling air flow into the air-distribution chamber, whereby the blast pressure is adjustable within a sufficiently wide range for 4–19 mm glasses by adjustment of said vane adjuster.

2. The device as set forth in claim 1, wherein said throttle valve means includes means for providing a substantially constant force against said throttle valve means to counteract pivoting and to hold said throttle valve means in a maximum throttle position when a pressure between the nozzle blocks and the throttle valve means is a substantially minimum value within the adjustable pressure range.

3. The device as set forth in claim 2, wherein said means for providing a substantially constant force against said throttle valve means retains said throttle valve means in a maximum throttling position when a pressure between the nozzle blocks and the throttle valve means is not higher than 5 Pa.

4. The device as set forth in claim 3, wherein said vane adjusters are configured to provide a pressure having a value substantially within a range of 5 Pa–7000 Pa, as measured between said nozzle blocks and said throttle valve means.

5. The device as set forth in claim 2, wherein the pivotal mounting of said throttle valve means is arranged such that the weight of said throttle valve means is the means for providing a substantially constant force against the throttle valve to counteract the pivoting of the throttle valve means and to hold the throttle valve means in said maximum position.

6. The device as set forth in claim 2, wherein said means for providing a substantially constant force against the throttle valve means is an air spring.

7. The device as set forth in claim 6, wherein said air spring includes a pneumatic cylinder for pivoting said throttle valve means to an open, non-throttling position.

8. The device as set forth in claim 7, wherein said pneumatic cylinder includes means for automatically opening said throttle valve means after said throttle valve means has turned more than a predetermined angle $\alpha$.

9. The device as set forth in claim 1, wherein said throttle valve means includes means for providing a substantially constant force against said throttle valve means such that said throttle valve means is in a throttling position when a first of said at least two blowers is running with said corresponding vane adjuster shut off and a second of said at least two blowers is stopped with said corresponding vane adjuster partly open.

10. The device as set forth in claim 9, wherein said means for providing a substantially constant force is configured to provide a force such that the throttle valve means is in a maximum throttle position when said corresponding vane adjuster of said second of said at least two blowers is substantially open.

11. The device for blast pressure as set forth in claim 2, wherein said means for providing a substantially constant force against said throttle valve means is configured such that said throttle valve means is in a throttling position when the first of said at least two blowers is running with said corresponding vane adjuster shut off and the second of said at least two blowers is stopped with said corresponding vane adjuster partly open.

12. The device as set forth in claim 11, wherein said means for providing a substantially constant force is configured to provide a force such that the throttle valve means is in a maximum throttle position when said corresponding vane adjuster of said second of said at least two blowers is substantially open.

* * * * *